US007536548B1

(12) United States Patent
Batke et al.

(10) Patent No.: US 7,536,548 B1
(45) Date of Patent: May 19, 2009

(54) SYSTEM AND METHODOLOGY PROVIDING MULTI-TIER-SECURITY FOR NETWORK DATA EXCHANGE WITH INDUSTRIAL CONTROL COMPONENTS

(75) Inventors: Brian Alan Batke, Novelty, OH (US); John Joseph Baier, Mentor, OH (US); Richard Alan Morse, Hudson, OH (US); David Michael Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 776 days.

(21) Appl. No.: 10/162,320

(22) Filed: Jun. 4, 2002

(51) Int. Cl.
*G06F 21/00* (2006.01)
*H04L 9/00* (2006.01)
*H04K 1/00* (2006.01)

(52) U.S. Cl. .............................. 713/166; 726/1; 726/2; 713/168

(58) Field of Classification Search .................. 726/11, 726/14, 15, 4, 5, 10; 713/152, 166
See application file for complete search history.

(56) References Cited

U.S. PATENT DOCUMENTS 5,446,903 A * 8/1995 Abraham et al. ............ 710/240
5,539,906 A 7/1996 Abraham et al.
6,055,236 A * 4/2000 Nessett et al. ............... 370/389
6,061,603 A * 5/2000 Papadopoulos et al. ....... 700/83
6,061,796 A * 5/2000 Chen et al. .................... 726/15
6,201,996 B1 * 3/2001 Crater et al. ................... 700/9
6,268,789 B1 * 7/2001 Diamant et al. ............ 340/5.74
6,286,104 B1 * 9/2001 Buhle et al. .................... 726/4
6,295,605 B1 * 9/2001 Dockter et al. .............. 713/166
6,381,631 B1 * 4/2002 van Hoff .................... 709/202
6,519,647 B1 * 2/2003 Howard et al. .............. 709/229
6,624,388 B1 * 9/2003 Blankenship et al. .... 219/130.5
6,646,564 B1 * 11/2003 Azieres et al. .............. 340/679
6,807,636 B2 10/2004 Hartman
6,819,960 B1 * 11/2004 McKelvey et al. ............ 700/17
6,957,112 B2 10/2005 Ina et al.
7,117,359 B2 * 10/2006 Wood et al. ................. 713/155
2003/0126468 A1 * 7/2003 Markham ................... 713/201
2003/0229811 A1 * 12/2003 Siegel et al. ............... 713/202
2004/0107345 A1 6/2004 Brandt et al.
2004/0153171 A1 8/2004 Brandt et al.
2005/0005093 A1 1/2005 Barrels
2005/0183143 A1 8/2005 Anderholm et al.
2005/0235148 A1 10/2005 Schaidt
2006/0021001 A1 * 1/2006 Giles et al. ..................... 726/1
2006/0130123 A1 * 6/2006 Andreev et al. ................ 726/2
2006/0248350 A1 * 11/2006 Stanev ........................ 713/189
2008/0028389 A1 * 1/2008 Genty et al. ................ 717/174
2008/0137830 A1 * 6/2008 Bhogal et al. .......... 379/201.04
2008/0215882 A1 * 9/2008 Coldicott et al. ............ 713/166

* cited by examiner

*Primary Examiner*—Christopher A Revak
(74) *Attorney, Agent, or Firm*—Amin Turocy & Calvin LLP; R. Scott Speroff

(57) ABSTRACT

The present invention relates to a system and methodology facilitating network security and data access in an industrial control environment. An industrial control system is provided that includes an industrial controller to communicate with a network. At least one security layer can be configured in the industrial controller, wherein the security layer can be associated with one or more security components to control and/or restrict data access to the controller. An operating system manages the security layer in accordance with a processor to limit or mitigate communications from the network based upon the configured security layer or layers.

31 Claims, 12 Drawing Sheets

800

READ SECURITY STORE TO DETERMINE A MAPPING FOR POTENTIAL COMMUNICATIONS — 810

DETERMINE SECURITY LAYERS ASSOCIATED WITH MAPPING — 814

APPLY SECURITY COMPONETS IN ACCORDANCE WITH THE LAYERS — 818

ESTABLISH COMMUNICATIONS WITH SUITABLY CONFIGURED DEVICES — 822

SYSTEM AND METHODOLOGY PROVIDING MULTI-TIER-SECURITY FOR NETWORK DATA EXCHANGE WITH INDUSTRIAL CONTROL COMPONENTS

TECHNICAL FIELD

The present invention relates generally to industrial control systems, and more particularly to a system and methodology to facilitate data transfers between a plurality of industrial control components in accordance with a multi-tier security architecture.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC). Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Various remote applications or systems often attempt to update and/or acquire PLC information or related device information via a plurality of different, competing and often incompatible or insecure network technologies. A major concern with this type of access to PLC's and control systems in general, relates to the amount of security that is provided when sending or receiving data to and from the PLC. In most factories or industrial environments, complex and sometimes dangerous operations are performed in a given manufacturing setting. Thus, if a network-connected controller were inadvertently accessed, or even worse, intentional sabotage were to occur by a rogue machine or individual, potentially harmful results can occur.

One attempt at providing security in industrial control systems relates to simple password protection to limit access to the systems. This can take the form of a plant or controls Engineer or Administrator entering an alpha-numeric string that is typed by an operator each time access is attempted, wherein the controller grants access based on a successful typing of the password. These type passwords are highly prone to attack or discovery, however. Often times, users employ passwords that are relatively easy to determine (e.g., person's name or birthday). Sometimes, users exchange passwords with other users, whereby the password is overheard or simply, a user with improper authorization comes in contact with the password. Even if a somewhat higher level of security is provided, parties employing sophisticated hacking techniques can often penetrate sensitive control systems, whereby access should be limited to authorized users in order to mitigate potentially harmful consequences.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide a multi-tiered security framework that mitigates unauthorized data access within an industrial controller environment. A layered and adaptable security architecture is provided in a Programmable Logic Controller (PLC) or PC-based controller and/or in conjunction with a module/system exchanging data with the controller. The security architecture can include a plurality of configurable security layers having associated security components to facilitate adapting the PLC to a desired security level in accordance with a variety of different applications. For example, in a lower-level application such as a monitoring application, fewer security layers may be configured to mitigate PLC data access than in a more sensitive application that controls potentially dangerous manufacturing operations (e.g., dangerous if unauthorized access permitted).

Security layers can include a trust component to provide machine authentication, an encryption component to provide user authentication, authorization, and data encryption, and a policy component to facilitate varying levels of data access (e.g., restrict data access of specified machines and/or persons according to selected security policies). Other aspects can include enabling one or more virus detection components to analyze received data, providing segmented security areas within the controller having various security mappings or permissions, and maintaining subnet lists specifying valid machine and/or data access addresses. Still other security layers can include virtual private networks mitigating unauthorized controller access, encapsulation protocols shielding underlying control protocols, and LAN-locked layers mitigating controller access from public networks.

In accordance with one aspect of the present invention, security components such as public keys and trusted certificates can be provided to establish a trust between network-based components attempting to communicate within an industrial controller environment. This can include employment of such security components as an Internet Key Exchange (IKE), Internet Protocol Security (IPSEC), Kerberos, one or more security policies, Secure Socket Layers (SSL) and/or other security components in order to limit data access by non-trusted parties. Encryption technologies can be employed in establishing trust relationships, mitigating unwanted data access of private data, and encapsulating control data within a security packet. This can include encapsulating local and/or other network protocols within an encrypted transmission stream that includes such protocols as Ethernet (e.g., IEEE802.3, TCP/IP, UDP, EtherNet/IP, and so forth), ControlNet®, DeviceNet®, Data Highway (DH)DH+, CIP, and/or other network protocols (e.g., Foundation Fieldbus (H1 and Fast Ethernet) Modbus/TCP, Profibus). Industrial components communicating via networks can be configured in accordance with one or more desired levels of security and/or security layers. Security layers can be selected in various combinations with respective layers having one or more associated security components. Data access can be stringently or generously permitted (or there between if desired) according to the selected security layer, layer combination, and/or security components associated with respective layers.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating network security and data access in an industrial control environment. An industrial control system is provided that includes an industrial controller (e.g., PLC, PC-based controller or equivalent) to communicate with a network such as the Internet. Security layers can be configured in the industrial controller, wherein the layers can be associated with one or more security components to control and/or restrict data access to the controller and/or data access to components associated with the controller. An operating system manages the security layers in accordance with a processor to limit or mitigate communications from the network based upon the configured security layers.

Figure 1:
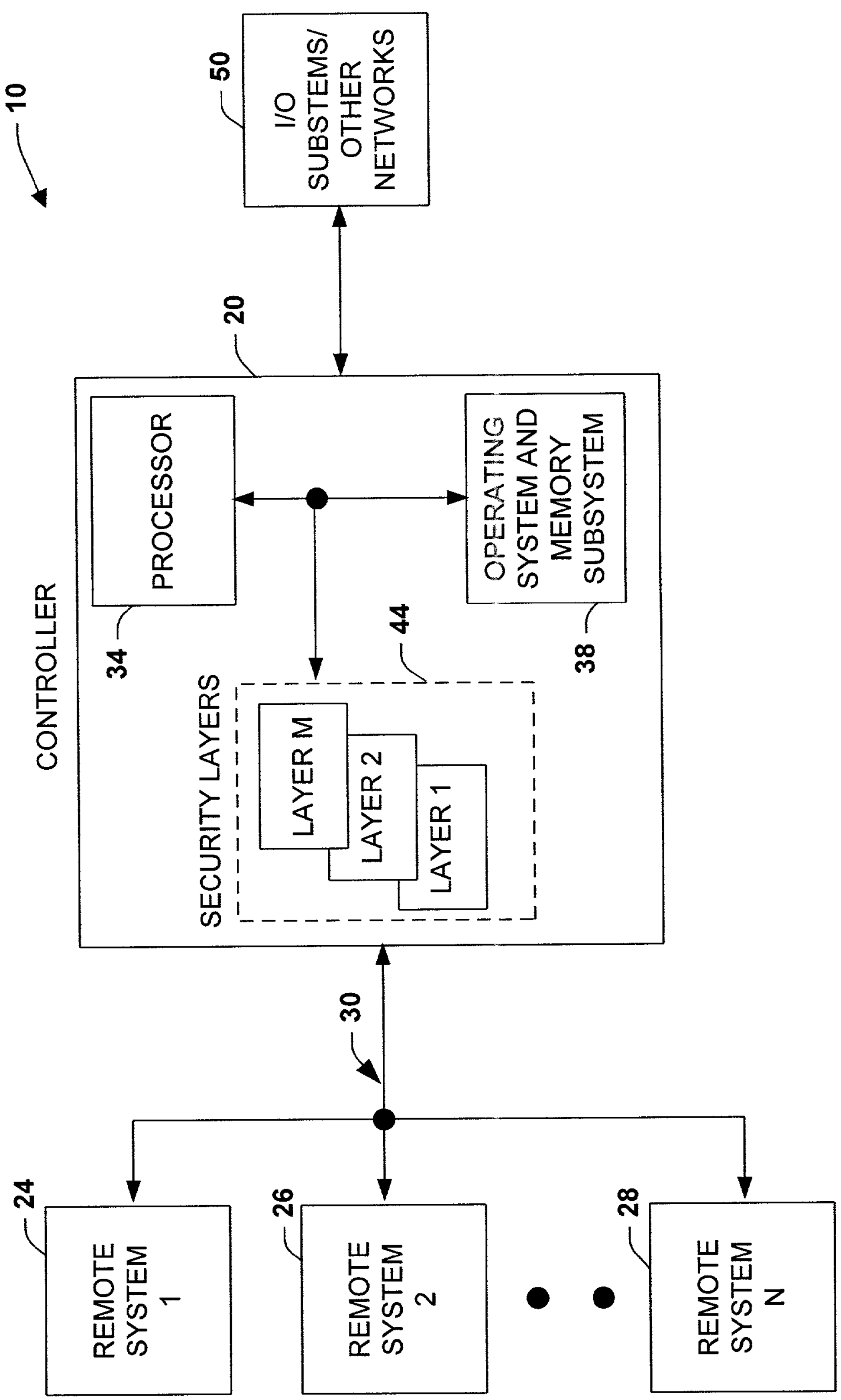
FIG. 1 is a schematic block diagram illustrating an industrial controller and a multi-tier security architecture in accordance with an aspect of the present invention.

Referring initially to FIG. 1, an industrial control and multi-tier security system 10 is illustrated in accordance with an aspect of the present invention. The system 10 includes an industrial controller 20 communicating to one or more remote systems 24-28 across a local factory and/or a public network 30 such as the Internet. A processor 34 (or processors) in the controller 20 directs an associated operating system 38 that is part of larger memory subsystem in the controller. The operating system 38 (e.g., Microsoft® Windows® NT/2000/XP, Windows CE, Linux, .NET, OS-9, UNIX, VRTX, QNX, VxWorks, CE.NET, custom-designed) in connection with the processor 34 manage a layered security component 44 in order to mitigate un-secure, unauthorized and/or unauthenticated access from the network 30 and associated remote systems 24-28. The layered security component 44 includes 1 to M layers of configurable and selectable security protocols, M being an integer, wherein respective layers can include one or more security components that are described in more detail below.

It is noted that the layered security component 44 can reside in the controller 20 and/or reside outside of the controller such as in an associated communications module or server (not shown) in order to limit communications access to the controller. In addition, the remote systems 24-28 can employ different levels of security to gain access to the controller 20, wherein the controller maintains various configurations depending on the type of remote system attempting access (e.g., remote $system_1$ is a local system adapted with a lower security level than remote $system_2$ attempting data access over a public network). The controller 20 can also communicate to various Input/Output subsystems 50 and/or other networks (e.g., Analog, Digital, Programmed/Intelligent I/O modules, other programmable controllers, communications modules, networks). It is also noted that communications to the I/O subsystems 50 and/or within the controller 20 can include varying security configurations per a selected module (or module grouping) and/or selected memory area, address, and/or address range within the controller (e.g., one module is configured for higher security levels (e.g., engages more security layers) than another module).

The layered security component 44 having associated security layers and security components, provides a multi-tier and configurable security architecture for the industrial controller system 10. Thus, control system users can select a desired security level based upon a type (e.g., type of security components selected per a given layer) and number of security layers selected. As one particular example, one user may configure three security layers that limit access to the controller 20 (or components within/associated with controller), whereas a second user may configure five security layers to limit access, whereby the respective layers have one or more various and/or different security components configured. It is noted that security configurations can be provided in a plurality of different manners. For example, a plurality of security components can be stored in accordance with the operating system and associated memory subsystem 38, wherein a designated layer (e.g., user interface editing parameters for $layer_1$) is assigned one or more of the stored security components. In another aspect, FLASH memory can be provided at 38, wherein prospective security configurations are downloaded to the controller 20. Yet another aspect includes replacing or changing portions of the memory subsystem 38 in accordance with a desired security setting or mapping. As will be described in more detail below, security components can include trust components, encryption components, policy components, and/or other components that can be selected in accordance with the layered security component 44.

Figure 2:
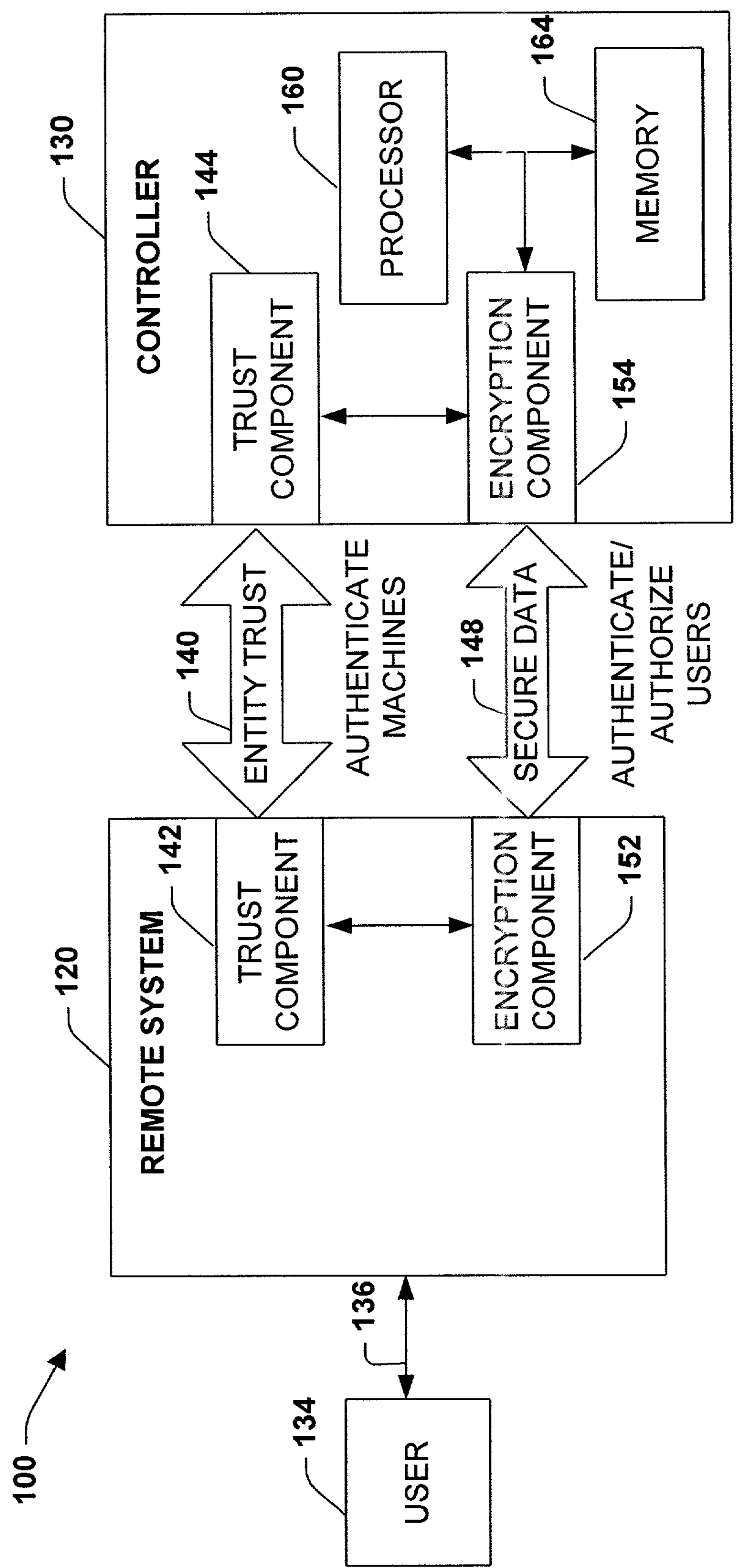
FIG. 2 is a schematic block diagram illustrating an industrial control architecture and associated security components in accordance with an aspect of the present invention.

Referring now to FIG. 2, a system 100 illustrates an industrial control architecture and associated security components in accordance with an aspect of the present invention. A remote system 120 sends and/or receives data to a controller 130 or other module or system interceding on behalf of the controller. Data access can include remote/local network access, wireless, Ir/DA (infra red data link), Virtual Private Network (VPN), phone dial-up, and/or substantially any data access to the controller 130 from the remote system 120. In accordance with one aspect of the present invention, a user 134 may seek access to remote resources of the controller 130 (e.g., database, modules) via the remote system 120. For example, the user 134 may dial in via a phone line or network connection 136 to the remote system 120. Before the user can gain access to the controller 130, however, a trust relationship 140 is established between the remote system 120 and the controller. A first and second bust component 142 and 144 are provided to authenticate (e.g. establish security agreement) the trust relationship 140 between the remote system or systems 120 and the controller 130. The trust components 142 and 144 can include a policy component such as an Internet Key Exchange (IKE) component. Certificates and/or Kerberos, for example, can be utilized to establish the trust relationship 140. It is noted that shared secrets can be automatically exchanged to establish the trust 140, for example.

According to one aspect of the present invention, the trust 140 may be established according to the Public Key Infrastructure (PKI)-PKI is readily understood by those of ordinary skill in the art and is generally defined by the Internet Engineering Task Force (IETF). As will be described in more detail below, a certificate (not shown) may be issued to or from the controller 130 that defines the trust relationship with the remote system 120. The certificate may include such information as an identifier field, a public key field, a serial number (of the certificate) activation, expiration date and digital signature field. In accordance with an alternative aspect of the present invention, Kerberos may be employed to facilitate the trust relationship 140. Kerberos is readily understood by those of ordinary skill in the art and is generally defined by the IETF. Kerberos operates by providing principals (e.g. users or services) with tickets that may be utilized to identify the principals. The tickets provide a cryptographic sequence of bytes to facilitate the trust relationship 140. As will be described in more detail below in relation to FIG. 6, Kerberos may also be employed to manage internal factory networks associated with the controller 130.

In conjunction with establishing the trust relationship 140, a substantially secure data channel 148 is provided between the remote system 120 and the controller 130. A first and second encryption component 152 and 154 provide data encryption for the secure data channel 148. According to one aspect of the present invention, an Internet Protocol Security (IPSEC) protocol may be employed to provide substantially secure data between remote systems and the controller 130. IPSEC is readily understood by those of ordinary skill in the art and specified by the IETF. As will be described in more detail below, IPSEC facilitates private and secure communications over public communications channels such as the Internet. By utilizing IPSEC, security issues associated with conventional control systems are mitigated.

According to an alternative aspect of the present invention, a Secure Sockets Layer (SSL) protocol specified by the IETF, may be employed by the encryption components 152 and 154. A goal of the SSL Protocol is to provide privacy and reliability between two communicating applications. The protocol can be composed of two layers, for example. At the lowest level, layered on top of a common transport protocol (e.g., TCP[TCP]), is an SSL Record Protocol. The SSL Record Protocol is employed for encapsulation of various higher-level protocols. One such encapsulated protocol, an SSL Handshake Protocol, enables the first and second system to authenticate each other and to negotiate an encryption algorithm and cryptographic keys before an application protocol transmits or receives its first byte of data. An advantage of SSL is that it is application protocol independent. It is noted that a higher-level protocol can layer on top of the SSL or IPSEC Protocol transparently.

The controller 130 includes a processor and associated memory component 164 to facilitate user authentication and authorization between the remote system 120 and the controller 130. For example, a user access-request (e.g., remote request to access controller resources) may be received from the user 134 or remote system 120 and directed to the processor 160 to authenticate and authorize the user via the encrypted data channel 148. After the remote system and/or user 134 has been authenticated and authorized, the user or system can then be permitted access to the controller 130. It is noted that authentication refers to a determination that a purported user or system is whom they claim to be. Authorization is a process of verifying that a user or system has been authorized by the controller 130 to access controller resources. It is further noted that authorization can include enabling partial and/or constrained access to one or more portions of the controller 130. For example, the controller 130 may desire to limit access of confidential data locations from designated users who may need only access a portion of the resources, yet enable the designated users access to other resources or portions thereof.

Figure 3:
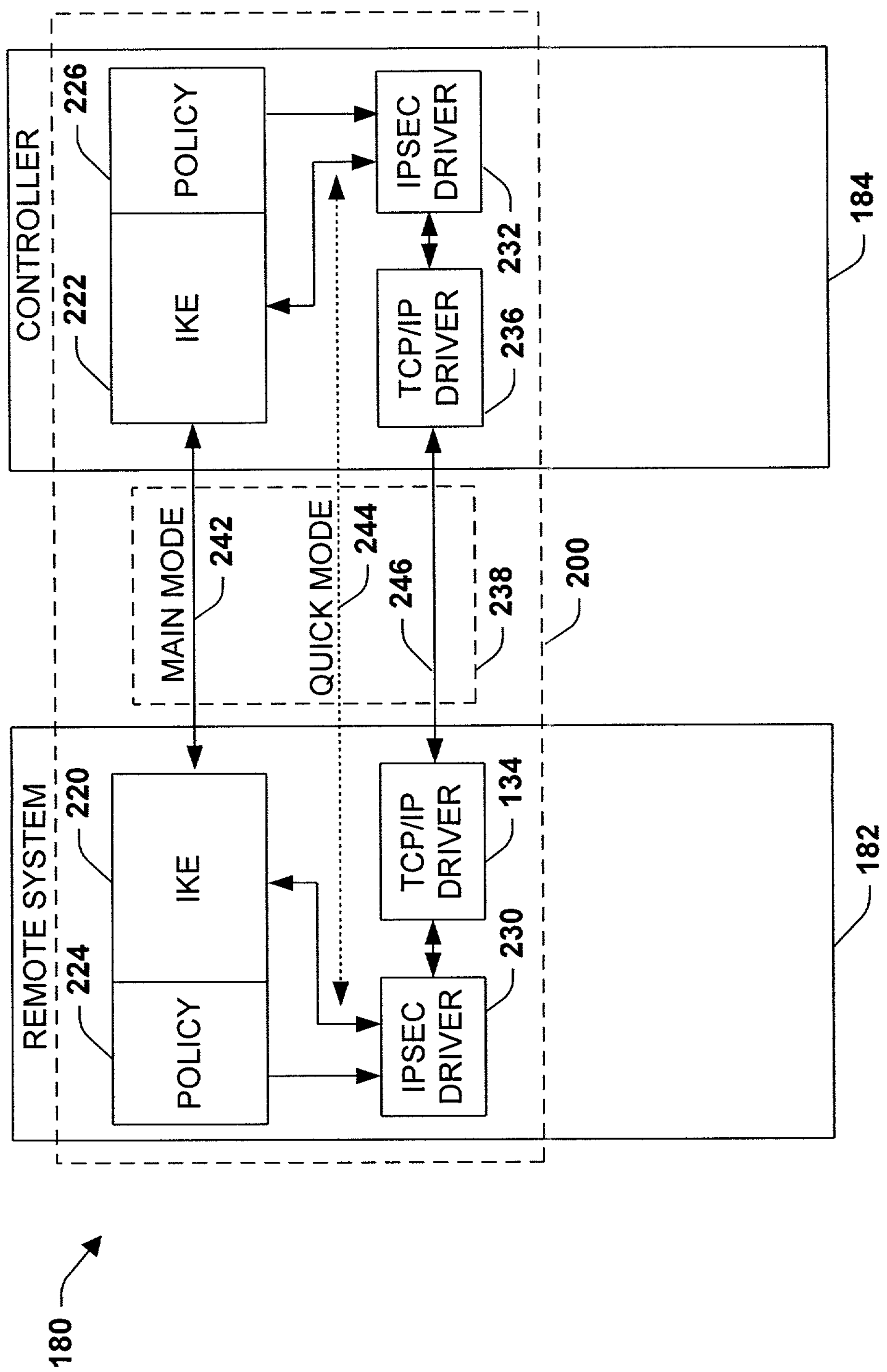
FIG. 3 is a schematic block diagram illustrating a security negotiation exchange and associated components in accordance with an aspect of the present invention.

Turning now to FIG. 3, a system 180 illustrates a more detailed security system according to one particular aspect of the present invention. As noted above, before user and/or machine authentication and authorization occurs, a trust and encryption should be established between a remote system 182 and a controller 184 via a trust subsystem 200. In addition, one or more of the security components discussed can be selected and configured within a security layer or layers according to a desired security level as described above.

The trust subsystem 200 includes an Internet Key Exchange (IKE) subsystem 220 and 222 for securing network traffic 238 between systems 182 and 184. As will be described in more detail below, the trust subsystem 200 may also include policy modules 224 and 226 to enable configuration of the IKE subsystems 220 and 222. The policy modules 224 and 226 can also provide security configuration information to Internet Protocol Security (IPSEC) drivers 230 and 232 that communicate via TCP/IP drivers 234 and 236 (or other network drivers) thereby enabling substantially secure network traffic 238 between the systems 182 and 184. A negotiation phase, referred to as Main Mode 242 is initiated between the IKE subsystems 220 and 222 in order to establish a machine level trust between the parties. A second negotiation phase known as Quick Mode 244 that utilizes keying material derived in Main Mode 242 is employed to provide a secure data channel 246 between the parties. As described above, an SSL protocol may be utilized in place of IPSEC to provide the secure data channel 246.

The policy modules 224 and 226, retrieve IPSEC policy (illustrated below in FIG. 4) from a local memory, directory domain, a configured set of local policies, or from a local cache. The policy modules 224, 226 then distribute authentication and security settings to the IKE modules 220, 222, and filters, described below, to the IPSEC Drivers 230 and 232. The IKE modules 220, 222 receive authentication and security settings from the policy modules 224, 226 and wait for requests to negotiate IPSEC security associations (SAs). When requested by the IPSEC Drivers 230, 232 the IKE modules 220, 222 may negotiate two types of SAs, for example, (e.g., an ISAKMP SA and an IPSEC SA, described below) with a suitable endpoint based on the request of the IPSEC Drivers 230, 232 and policy settings obtained from the policy modules 224, 226. After an IPSEC SA is negotiated, for example, the IKE module 220, 222 sends the SA settings to the IPSEC Drivers 230, 232. The IPSEC Drivers generally monitor and secure unicast network traffic. After filters are received from the policy modules 224, 226, the IPSEC Drivers 230, 232 determine which packets are permitted, blocked, or secured. For secure traffic, the IPSEC Drivers 230, 232 either employs active SA settings to secure the traffic or requests that new SAs be created. The IPSEC Drivers 230, 232 may be bound to the TCP/IP Drivers 234, 236 when the policy modules 224, 226 begin to provide IPSEC processing for data packets that pass through the TCP/IP Drivers 234, 236.

Figure 4:
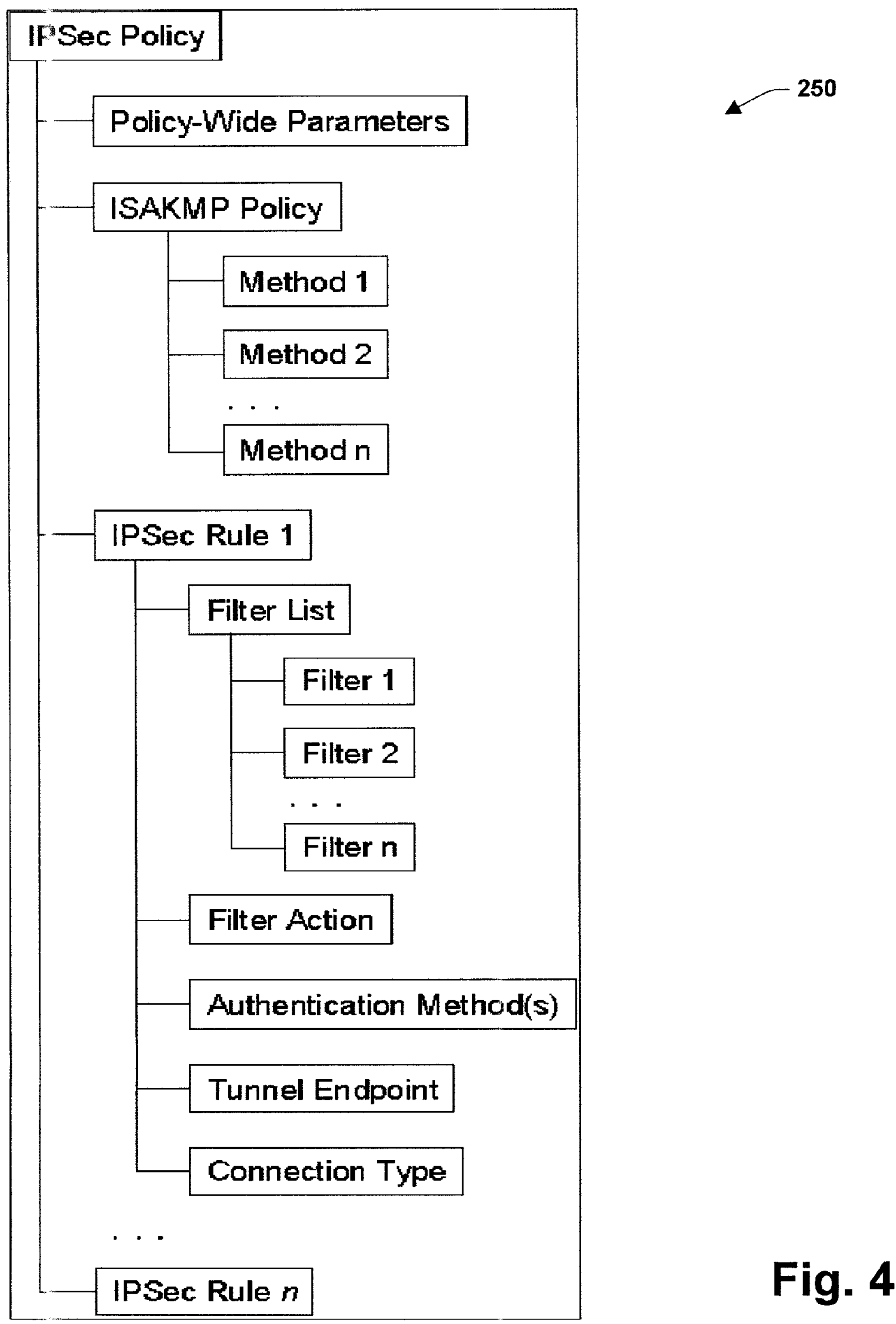
FIG. 4 is a schematic block diagram illustrating a security policy store and associated parameters in accordance with an aspect of the present invention.

Referring briefly to FIG. 4, IPSEC policies 250 and filters associated with the policy modules 224 and 226 described above will now be described in more detail. The IPSEC policy 250 may be contained in a data storage (not shown) associated with the policy modules 224, 226. The data in the policy 250 represents a desired protection for traffic between devices such as controllers and remote systems on a network. The data is made up of various attributes related to the parties (e.g., IP address and port number), the communication methods supported (e.g., algorithms and key lengths), IKE key negotiation and management, and user-defined settings for other type access described below in relation to FIG. 5.

The IPSEC policy 250 may include the following information:

Policy-wide parameters—Includes polling intervals employed to detect changes in policy.

ISAKMP policy—Contains IKE parameters, such as encryption key lifetimes, and other settings. The ISAKMP policy also contains a list of security methods for protecting the identity of IPSEC peers during authentication.

IPSEC rules—Contains one or more rules that describe IPSEC behavior for the policy.

IPSEC rules are the part of the policy data that is employed to associate IKE negotiation parameters with one or more filters.

Respective IPSEC rules may include the following:

Filter List—Contains one or multiple predefined filters that describe the types of traffic to which an action (permit, block, or secure) is applied.

Filter Action—Includes the type of action to take (permit, block, or secure) for packets matching the filter list. For the secure action, the negotiation data contains one or more security methods that are employed in order of preference during IKE negotiations and other IPSEC behavior settings. Respective security methods describe a security protocol to use, cryptographic algorithms, and session key regeneration settings.

Authentication Method(s)—Contains one or more authentication methods that are utilized for protection during IKE negotiations. For example, such authentication methods may be related to a Kerberos protocol, a certificate issued from a specified certificate authority, and/or a preshared key.

Tunnel Endpoint—Contains settings that determine whether traffic is tunneled and, if it is, the tunnel endpoint.

Connection Type—Contains a setting that specifies whether a rule applies to local area network (LAN) connections, to Point-to-Point Protocol (PPP)-based connections, to both types of connections, or to other type connections.

Filters are generally part of the policy data employed to specify network connection information. One or more filters are associated with negotiation data; defining which security measures are utilized to protect network connections that match the filter. The policy modules 224 and 226 process filters obtained from the IPSEC policy. The policy modules maintain a list of filters for the IPSEC components and provide a filter list to the IPSEC drivers 230, 236. The policy modules 224, 226 manage a filter list that includes items corresponding to respective filters configured in the IPSEC policy and a generic filter and mirrored filters. Items in the list can include the following information: Network address data, Source/destination address, source/destination mask, source/destination port, and protocol, The determination of whether the filter is for a tunnel and, if it is, its address, The rule ID for the filter, Flags indicating:
- Whether the filter should be mirrored
- Whether the filter was provided to the IPSEC Driver
- Whether the filter is instantiated from a more generic filter
- Whether the filter is dynamic
- Whether the filter is blocking, clear, or pass through
- The direction of the filter
- The weight of the filter
- The type of interface that the filter supports
- The parent filter ID (if instantiated)

It is noted, that when the filter has a mirror, a copy of the filter is created and the source and destination addresses are swapped. It is to be appreciated that the above described policies can be adapted in a local and/or remote user orientation. For example, of a user were in proximity of the controller (e.g., line of site with the controller) the user may have different rights, policies, rules established/configured than the same or other user attempting access to the controller in a remote location.

Referring back to FIG. 3, the IKE modules, 222, 224 and interrelationships of Main Mode 242 and Quick Mode 244 are described in more detail. The IKE modules 220, 222 re employed to establish a combination of mutually agreeable policy and keys that define security services, protection mechanisms, and cryptographic keys between communicating peers such as the remote system 182 and the controller 184. This combination may be referred to as a security association (SA). The SA is employed by the IPSEC Driver to protect corresponding network traffic 238.

To create an SA between systems, the IETF has established a standard method of SA and key exchange resolution, which combines Internet Security Association and Key Management Protocol (ISAKMP) and an Oakley Key Determination Protocol. This standard method is IKE and is described by the IETF. Oakley generates and manages authenticated keys to encrypt and decrypt the information for both negotiations utilizing a Diffie-Hellman key exchange protocol, for example.

The Oakley standard provides the Main/Quick modes as is well understood. Main Mode 242 provides for new key generation material and a new encryption key, wherein the Quick Mode 244 negotiations are derived from the Main Mode negotiations 242. The Main Mode negotiations 242 establish a secure channel known as the ISAKMP SA between systems for the purpose of protecting security negotiations. To achieve this, the IKE modules 220 and 222 authenticate computer identities and exchange keying material to establish an automatically generated shared secret key. The Main Mode 242 provides the necessary identity protection during this exchange. This enables privacy by facilitating that identity information is not sent without encryption between communicating systems. Quick Mode negotiations 144 establish a secure channel 246 between the systems 182 and 184 for the purpose of protecting data. Because this negotiation phase involves the establishment of SAs that are negotiated on behalf of the IPSEC service, the SA created in Quick Mode is referred to as an IPSEC SA. During this phase, keying material is refreshed or, if necessary, new keys are generated.

After an SA has been established, the IKE modules 220, 222 send the SA and the shared encryption key to the IPSEC Drivers 230, 232 for use in protecting network traffic. The IKE module or the IPSEC Driver may initiate re-keying based on duration lifetime, byte count lifetime, and/or policy changes, for example. The IKE modules 220, 222 perform Main Mode negotiations with a peer system to establish protection suites and keys for subsequent use in protecting Quick Mode IKE communications. Main Mode Negotiation may occur in three parts: Negotiation of protection suites, A Diffie-Hellman exchange, and machine authentication, for example. ISAKMP payloads may be associated within messages relating to Main Mode 142. These payloads may be related as follows: A Security Association, a key exchange, and identification (ID) payload.

A first Security Association payload is a list of proposed protection suites for the ISAKMP SA sent by a network system initiator of the desired communications. A second Security Association payload sent in a reply message is a specific protection suite for the ISAKMP SA that is common to both IPSEC network systems. It is selected by a responder network system. The Key Exchange payload may be sent in a third message by the initiator and in a fourth message by the responder and contains Diffie-Hellman key determination information for the Diffie-Hellman key exchange process. The ID payload contains a nonce, which is a pseudorandom number that is utilized once. The initiator and responder network systems each send their own unique nonces. Nonces are employed to provide replay protection.

When initiating an IKE exchange, the IKE modules 220, 222 propose protection suites based on the applied security policy. Proposed protection suites can include attributes for encryption algorithms, hash algorithms, authentication methods, and Diffie-Hellman Oakley groups. The following Table lists some exemplary protection suite attribute values that are supported by the IKE modules 220, 222. It is to be appreciated that other attributes and values may be included.

| Attribute | Attribute Value |
| --- | --- |
| Encryption algorithm | DES, 3DES |
| Integrity algorithm | MD5, SHA-1 |
| Authentication method | Kerberos, preshared key, certificate |
| Diffie-Hellman group | Group 1 (768-bit), Group 2 (1024-bit) |

The initiating IKE module (e.g., module 220) proposes one or more protection suites in a similar order as they may appear in the applied security policy. If one of the protection suites is acceptable to the responding IKE peer (e.g., module 222) the responder selects one of them for use and responds to the initiator with its choice. After a protection suite has been negotiated, the IKE modules 220, 222 generate a Diffie-Hellman public and private key pair based on the negotiated Diffie-Hellman Oakley group. The IKE modules select a first Diffie-Hellman CSP found by searching in the following order of preference by CSP type: The cryptographic strength of a Diffie-Hellman key pair is related to its prime number length (key size). Diffie-Hellman groups with the following lengths can be defined: Group 1 is 768 bits, Group 2 is 1024 bits, Group 5 is 1536 bits. The IKE modules 220, 222 support a plurality of methods for authentication. For example, these methods may include Kerberos, Certificate-based digital signature, and/or Preshared key.

Upon the completion of Main Mode negotiations 242, or the expiration of a Quick Mode SA, the Quick Mode negotiation 244 is initiated. The IKE modules 220, 222 query the policy modules 224, 226 to determine appropriate filter actions, including whether a link is tunnel or transport, the protocol, and the encryption and hashing algorithms are proposed or accepted. Quick Mode negotiation messages may be protected with the ISAKMP SA established during Main Mode. Each successful Quick Mode SA negotiation generally establishes two IPSEC SAs. One is inbound and the other is outbound, for example. The following Table lists possible messages exchanged by IPSEC peers during Quick Mode negotiations 244.

| Quick Mode Message | Sender | Payload |
| --- | --- | --- |
| 1* | Initiator | ISAKMP header, Security Association (contains proposals and secure traffic description) |
| 2* | Responder | ISAKMP header, Security Association (contains a selected proposal) |
| 3* | Initiator | ISAKMP header, Hash |
| 4* | Responder | ISAKMP header, Notification |

Some of the possible related filter action choices described above are listed in the following Table.

| Filter Action Choices | ESP Encryption/Integrity Algorithm | AH |
| --- | --- | --- |
| High | DES/MD5 | None |
| Medium | None | MD5 |
| Custom | DES, 3DES, or none/MD5, SHA-1, or none | MD5 or SHA-1 |

The IKE modules 220, 222 generate session keys for both the inbound and outbound IPSEC SAs based on the Main Mode shared master key and nonce material exchanged during the Quick Mode negotiations. Additionally, Diffie-Heliman key exchange material can also be exchanged and utilized to enhance the cryptographic strength of the IPSEC session key.

Figure 5:
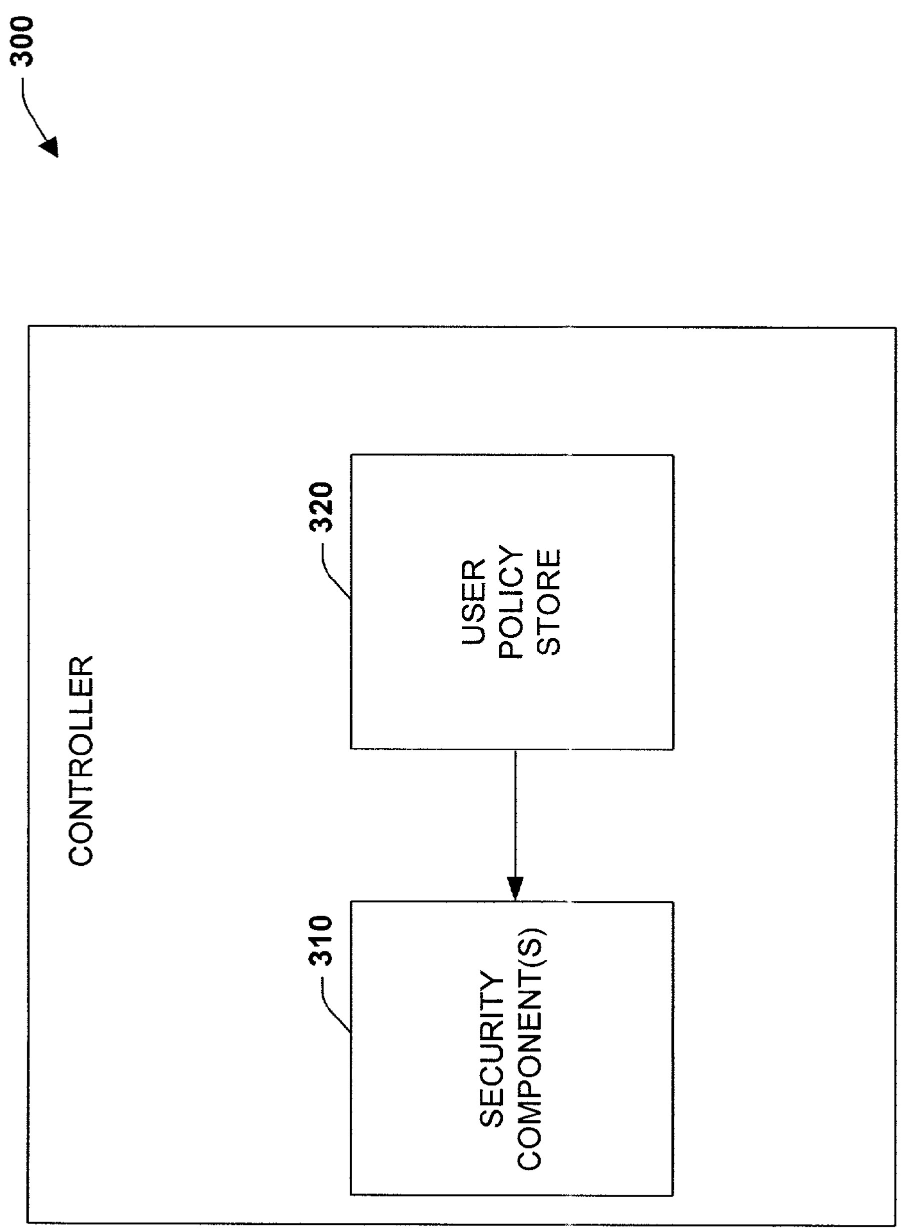
FIG. 5 is a diagram illustrating security policy configurations in accordance with an aspect of the present invention.

Referring now to FIG. 5, security policy configurations are illustrated in accordance with an aspect of the present invention. At 300, a controller is illustrated having a security component 310 that is configured in part from a user policy store at 320. As described above, security policies can be utilized to facilitate authentication, encryption, and/or other security aspects via a plurality of associated methods and filters. At 320, users can configure system-based policies and associated rules for granting or permitting/denying access to the controller 300 and/or components associated with the controller. User-defined policies can include a plurality of access variables that define a manner for which data access is granted by the controller 300. This can include time-based policies (e.g., no access given to any external system from 9:00 AM EST until 5:00 PM EST, read access granted to tier-3 layer devices after 6:00 PM PST). Location-based policies can be defined. For example, only devices from internal factory IP addresses permitted access, requests from outside the United States not permitted, designated factory locations granted access. User-designated policies can be configured such as lists that define people or IP addresses having proper/improper authorization to access the controller (e.g., only Controls Engineers on list in user policy store can access controller, designated maintenance people or management, substantially any person/machine classification, people listed that are to be excluded from access). Process-based policies can be defined such that during specified controls processes or programs, higher-level security measures or layers are employed, whereas during other processes, lower-level security layers are employed. As can be appreciated, logical rules can be established for a selected policy or combinations of policies. The rules can include AND, OR, NOT and substantially any BOOLEAN or mathematical combination (e.g., If it is after 5:00 CST, AND process 2 is running, permit access to operator A OR operator B, from Location Z OR Location Y).

Figure 6:
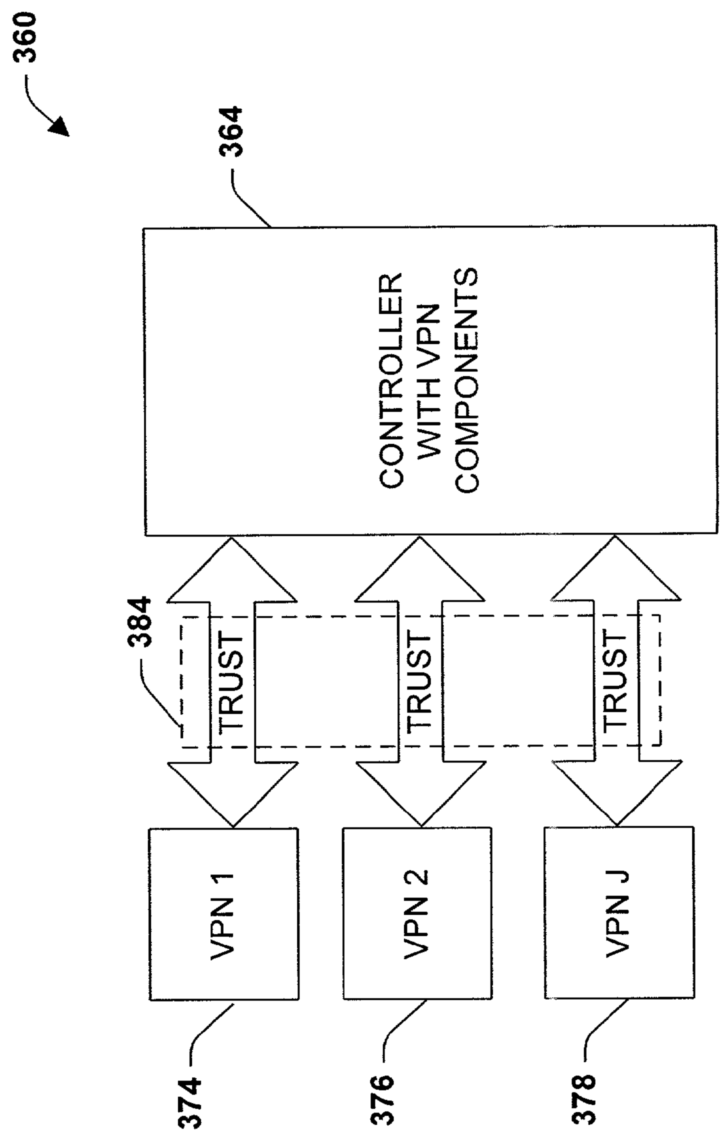
FIG. 6 is a schematic block diagram illustrating a virtual private network configuration in accordance with an aspect of the present invention.

Turning now to FIG. 6, a system 360 depicts a private network or Intranet structure wherein a negotiated trust can be employed in accordance with the present invention. The system 360 may include a controller 364 and a plurality of devices 374-378 configured with security components for communicating within a virtual private network (VPN) 384. The VPN 384 is a private data network that can employ a public telecommunication infrastructure, maintaining privacy through the utilization of a tunneling protocol and security procedures, as described above. This can involve encrypting data before sending it through the public network (not shown) and decrypting data at a receiving end. An additional level of security involves encrypting not only the data but also the originating and receiving network addresses, for example. Relative to the Internet, for example, tunneling involves utilizing the Internet as part of a private secure network. The "tunnel" can be viewed as a particular path that a given message, file and/or data may travel through the Internet.

In accordance with an aspect of the present invention, a trust may be established between the controller 364 and the other VPN devices 374-378. The trust may be established via Kerberos (or other security technique), for example, which provides for authenticating accesses to the controller 364. As discussed above, Kerberos is a network authentication system based upon a key distribution model. It enables entities communicating over networks to prove their identity to each other while mitigating eavesdropping or replay attacks. Kerberos also provides for data stream integrity (e.g., detection of modification) and secrecy (e.g., preventing unauthorized reading) by employing cryptography. According to Kerberos protocol, a ticket may be provided wherein the VPN devices (364, 374-378) may identify themselves. A ticket may be a sequence of bytes and may be imbedded in virtually any network protocol thereby enabling the processes implementing a particular protocol to determine the identity of the entities involved (e.g., controller, communications modules, other VPN devices).

Figure 7:
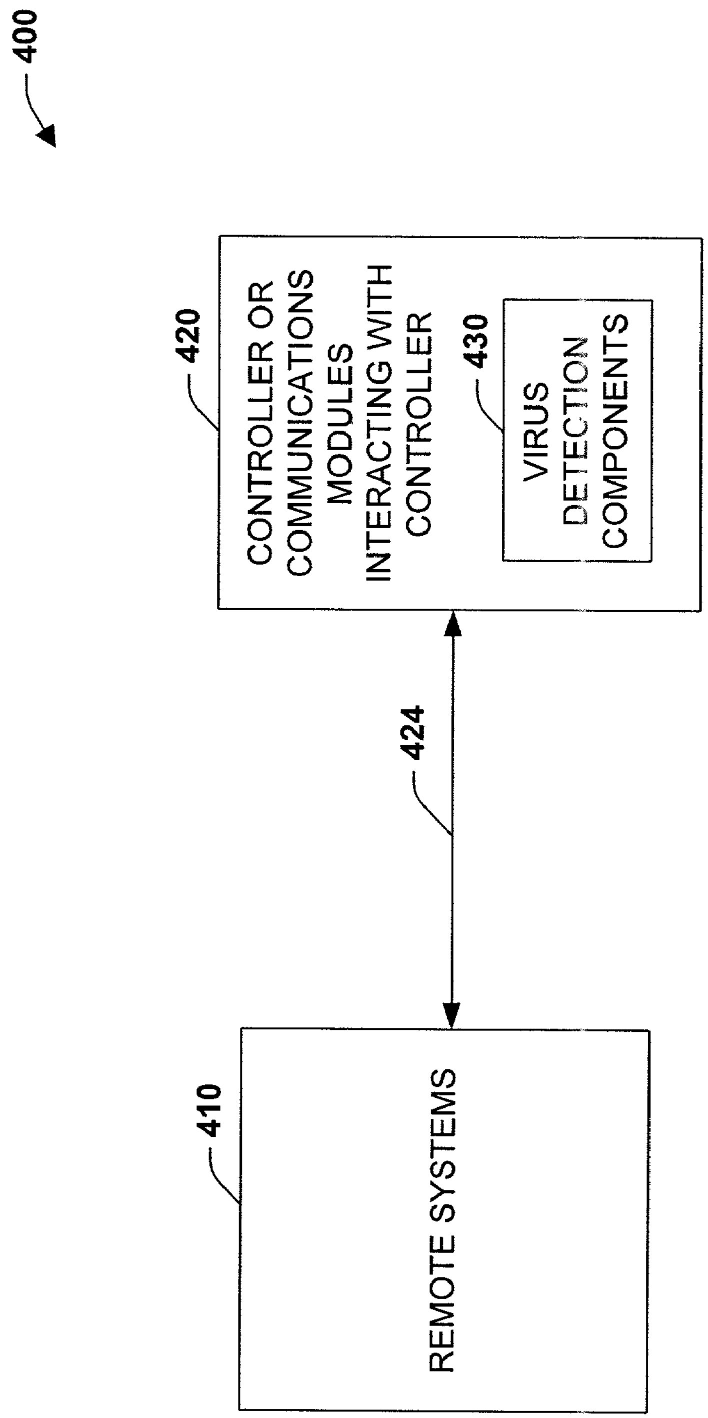
FIG. 7 is a diagram illustrating virus detection components in accordance with an aspect of the present invention.

Turning now to FIG. 7, a system 400 illustrates virus detection aspects in accordance with the present invention. One or more remote systems 410 interact with a controller 420 (or communications module interfacing to controller) over a network 424. At 430, one or more virus detection components 430 are provided to analyze and discard potentially harmful files or data that can be detected and received from the network 424. Viruses generally cannot infect other components such as computers or controllers without assistance and can be propagated by vectors such as via humans trading programs with others or loading files from the Internet, for example. The virus may do nothing but propagate itself and then allow a controller program to run normally. Many viruses, written by potential saboteurs, can do irreversible damage, like deleting all user files or data. The virus detection components 430 can include programs to detect and remove controller viruses. Some detection programs scan executable files and boot blocks for a list of known viruses. Other programs are generally always active, attempting to detect the actions of general classes of viruses. In addition the virus detection components 430 should include a regular update service in order to become current with the latest viruses as they are discovered. The virus detection components 430 can be commercially available packages (e.g., Norton, Sophos, eTrust), custom-coded packages to detect known controller viruses, and/or combinations thereof.

Figure 8:
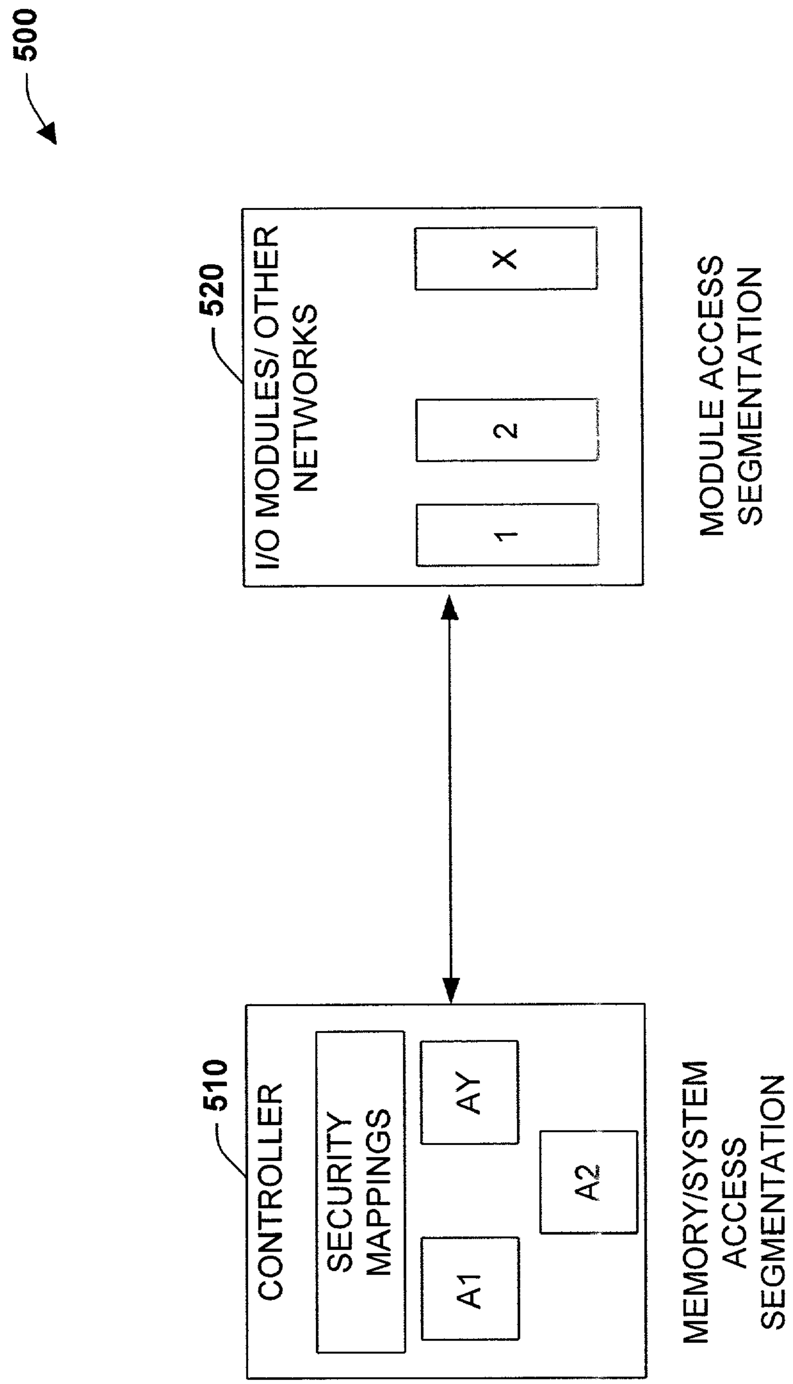
FIG. 8 is a schematic block diagram illustrating a segmented security architecture in accordance with an aspect of the present invention.

Referring now to FIG. 8, a segmented security system 500 is illustrated in accordance with an aspect of the present invention. A controller 510 can be segmented in a plurality of security areas A1 through AY, Y being an integer, wherein respective areas can be identified with an associated security layer or layers having respective security components. As an example, area $A_1$ can be a sensitive data area containing batch processing variables, wherein several security layers and associated security components must be negotiated before gaining access to $A_1$. On the other hand, area $A_2$ may be a non-critical area (e.g., process display variables) whereby relatively few security layers are configured. This type of security segmentation and assignment of security layers can be extended to I/O modules 520 and/or other modules/networks that interact with the controller 510. For example, 1 through X modules may be associated with (e.g., in a policy store on controller) a respective security configuration defining the security layers and associated components that are to be negotiated with the controller 510 in order to gain access to a respective module. Thus, the system 500 enables security layers and associated security components to be mapped to respective areas in the controller 510 and/or in relation to I/O or other type modules that interact with the controller.

Figure 9:
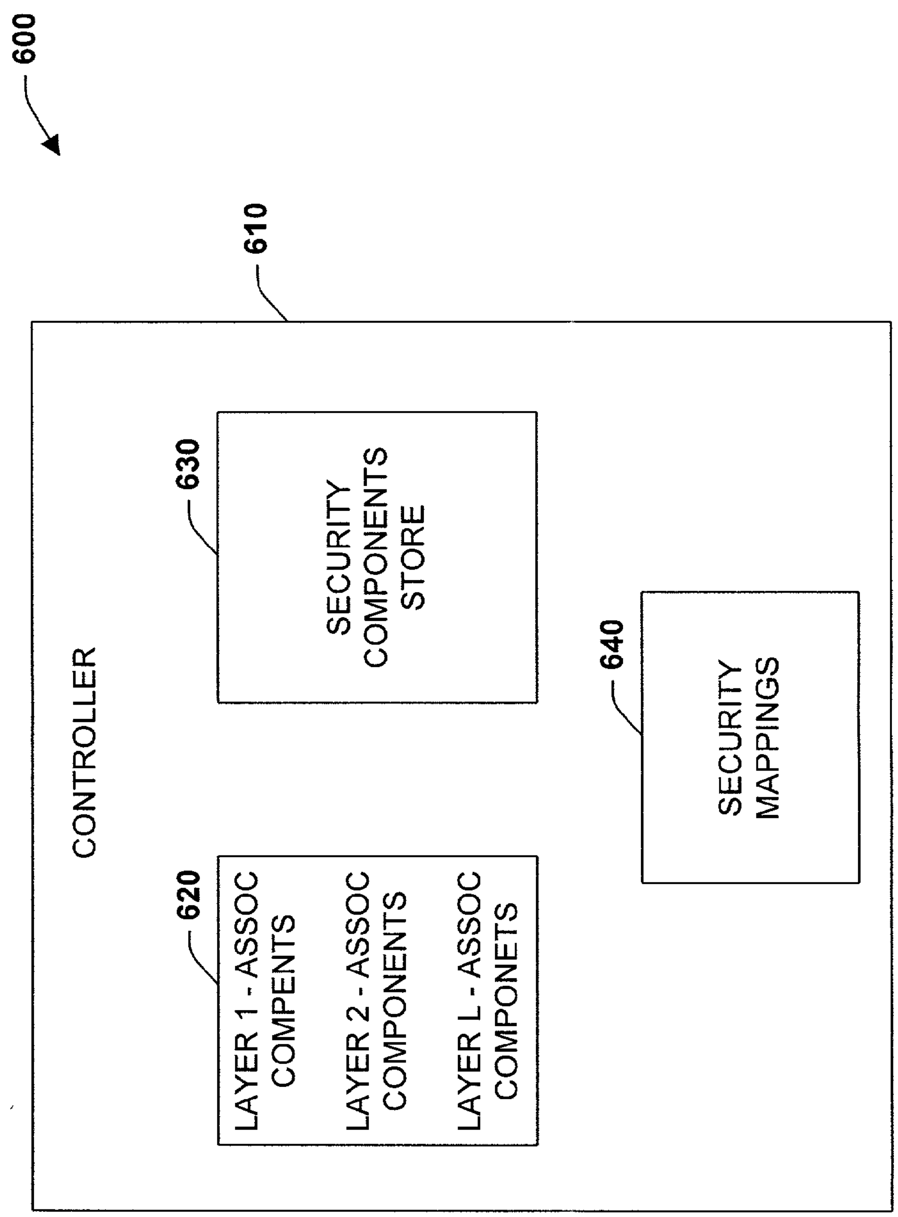
FIG. 9 is a schematic block diagram illustrating security component configuration in accordance with the present invention.

Referring to FIG. 9, a system 600 illustrates security configuration in accordance with an aspect of the present invention. A controller 610 includes a security layer store at 620. The security layer store includes 1 to L security layers, L being an integer, wherein respective layers are associated with or mapped to one or more security components that are stored in a security component store at 630. As noted above, the security components at 630 can be stored on the controller 610, downloaded to the controller, and/or provided as part of a firmware upgrade in the controller, for example. At 640, one or more security mappings are stored. The mappings relate respective areas and/or modules associated with the controller 510 to one or more security layers from the security layer component 620. As can be appreciated, the mappings at 640 can be associated with a plurality of policies and/or rules that define when a respective mapping is active. In addition, a global mapping can be configured, wherein any interaction with or through the controller 610 is defined in a global mapping region at 640 that can have the effect of overriding other security mappings that may also be stored.

Figure 10:
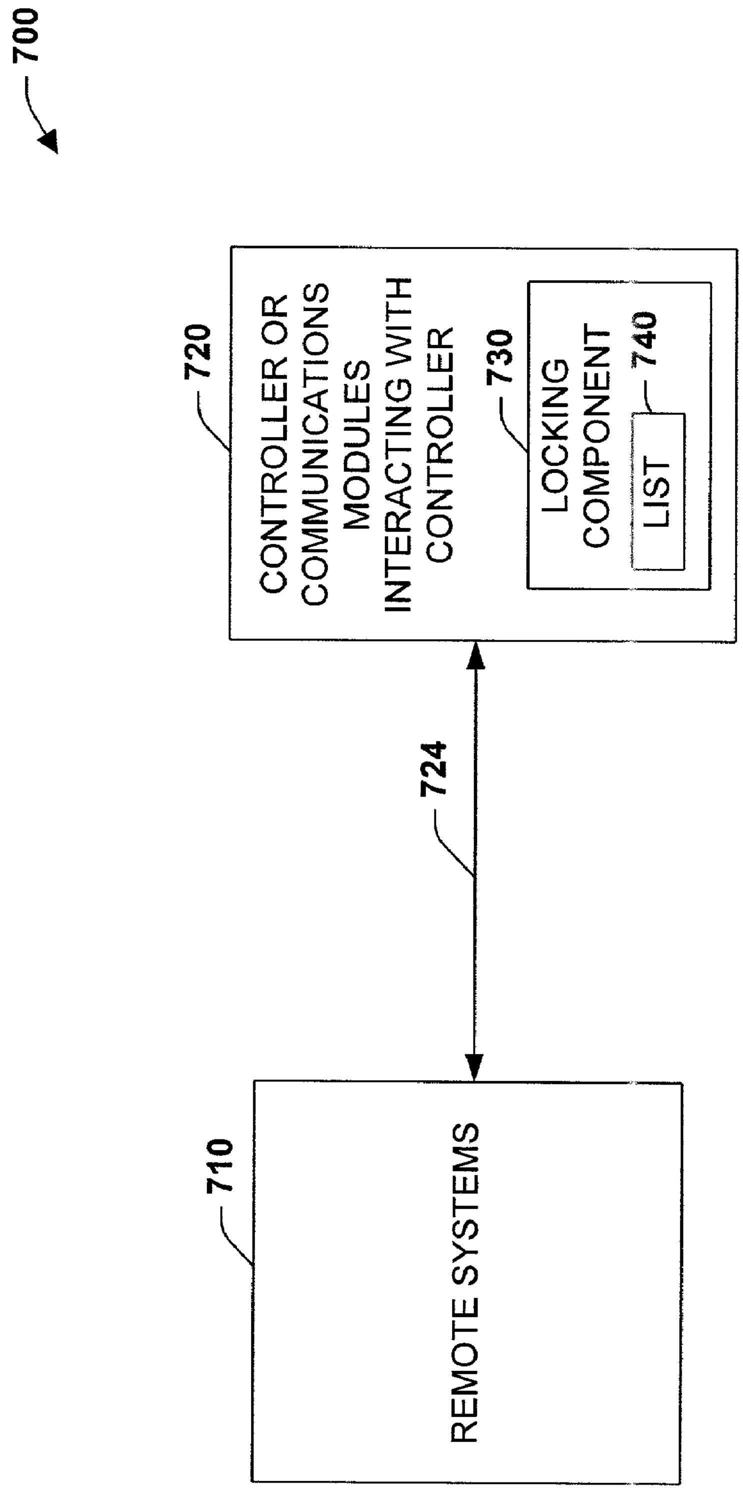
FIG. 10 is a schematic block diagram illustrating a locking component in accordance with the present invention.

FIG. 10 is a system 700 illustrating a locking component in accordance with the present invention. One or more remote systems 710 attempt interaction with a controller 720 (or communications module interfacing to controller) over a network 724. At 730, a locking component is provided that limits access to the controller 720. This can include a list 740 such as a subnet list of addresses that limit which remote systems 710 can gain access to the controller 720. In other words, if a communicating device address does not appear on the list 740, then access to the controller is prevented. The locking component 730 can also be utilized to create a LAN-locked network, whereby only devices of a selected Local Area Network (LAN) are provided on the list 740 and all other network access such as through a public network is prevented. The locking component 730 can also contain exclusionary entries. Thus, only the devices or addresses included on the list 740 are excluded from communicating with the controller 720.

Figure 11:
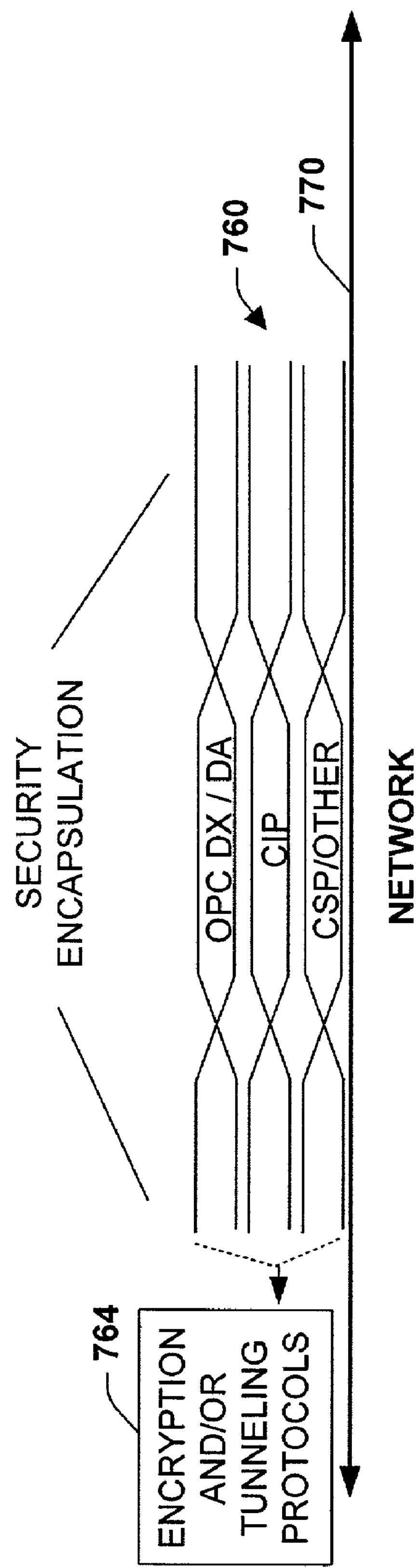
FIG. 11 is a diagram illustrating security encapsulation in accordance with the present invention.

Referring to FIG. 11, a protocol diagram 760 illustrates security encapsulation aspects in accordance with the present invention. At 764, one or more of the encryption and/or tunneling protocols described above (e.g., IPSEC, SSL, PPP) are employed to encrypt or encapsulate a plurality of control protocols illustrated at 760 that may also interact with a controller (not shown) via a network at 770. The control protocols at 760 can cooperate with higher-level network protocols such as the Ethernet, TCP/IP, Internet and/or other network protocols. As illustrated at 764, encryption or tunneling protocols can encapsulate or transport remote network protocols such as OLE for Process Control Data Exchange (OPC DX) protocols, OPC Data Access (DA) protocols, CIP protocols such as ControlNet, DeviceNet, and/or include Client Server Protocols (CSP). Other protocols that can be encrypted include serial protocols such as RS-232/422/485 and/or DataHighway/DataHighway+ (DH/DH+) control protocols.

Figure 12:
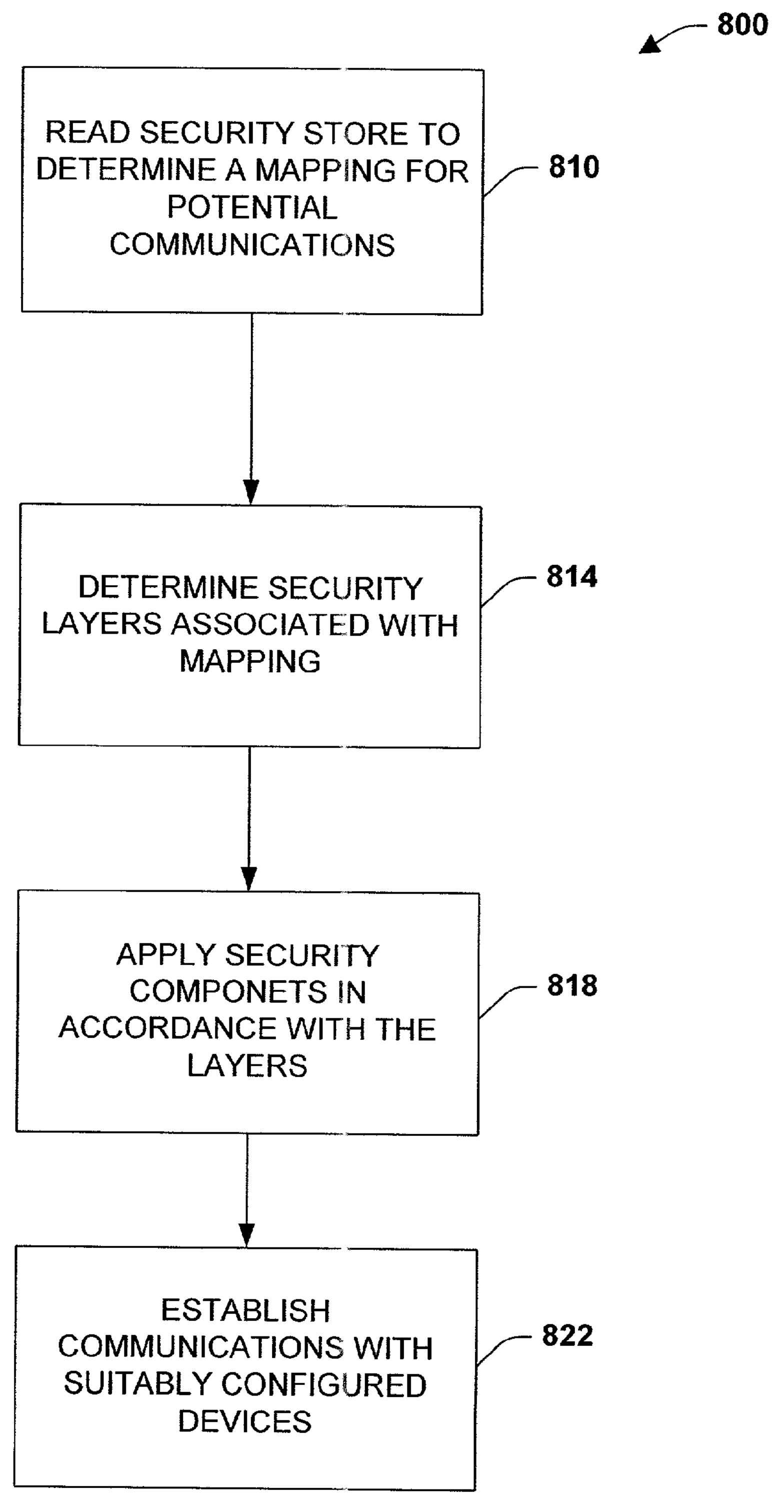
FIG. 12 is a flow diagram illustrating security layer and component configuration in accordance with the present invention.

FIG. 12 illustrates a security methodology 800 in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 12 illustrates a methodology 800 to facilitate data access security between a network device and a controller in accordance with an aspect of the present invention. At 810, a security store is read (e.g., at power-up of controller) to determine a mapping or security configuration for a controller. The mapping determines potential communications configurations that are to be negotiated with the controller in order to gain access to the controller, including potential areas within the controller and/or associated modules that interact with the controller. At 814, a determination is made as to the number of security layers that are associated with a respective mapping read at 810. For example, a first mapping may have four security layers configured whereas a second or subsequent mapping may have the same, or more or less than four security layers configured. At 818, respective layers from 814 are read and associated with one or more security components that are configured/defined for the respective layer.

For example, one layer may define virus detection components. A subsequent layer may define trust and/or encryption components. Another layer may define a policy store and associated user-defined and/or system-related policies. Still yet another layer may define VPN components and/or subnet lists/LAN-lock lists that define a sub-network of communicating devices which can describe devices to be included or excluded from communicating to the sub-network and/or private network (e.g., IP addresses that define or exclude communicating network devices). As described above, the mappings can include area definitions within the controller that are associated with different security layers. This can also include security mappings having variously configured layers for modules that communicate with and/or through the controller. At 822, communications are established with network devices in accordance with the mappings, security layers and associated security components selected for the respective layers. This can include security negotiations such as establishing a trust, in accordance with configured policies/rules, and/or employing one or more other security techniques such as encryption.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system, comprising:

an industrial controller that communicates with a network;

at least one security layer configured in the industrial controller, the security layer associated with at least one security component further comprising at least one of a trust component to authenticate a trust relationship between a remote system and the industrial controller, an encryption component to provide data encryption, and a policy component to facilitate varying levels of data access to the industrial controller, and including user interface editing parameters;

1 to M mappings that relate a plurality of security layers configured in the industrial controller to at least one security component per layer, the security layers are associated with at least one of similar security components and dissimilar security components, M being an integer;

a security layer store to map security layers to security components;

an operating system to manage the at least one security layer, the at least one security component stored in accordance with the operating system and an associated memory subsystem; and a processor to execute the operating system, the processor limits communications from the network based in part on the configured security layer.

2. The system of claim 1, the trust component includes at least one of Public Key Infrastructure (PKI) component and an Internet Key Exchange (IKE) component.

3. The system of claim 2, the trust component includes at least one of a certificate, a pre-shared key, and a Kerberos ticket.

4. The system of claim 1, the encryption component includes at least one of an Internet Protocol Security (IPSEC) component, a Kerberos component, a Secure Socket Layer (SSL), and a tunneling protocol.

5. The system of claim 4, the encryption protocol is employed to at least one of authenticate and authorize at least one of a user and a device.

6. The system of claim 5, further comprising at least one of an IPSEC driver and a TCP/IP driver to transport the encryption protocol.

7. The system of claim 5, further comprising at least one of a Main mode and a Quick mode negotiation to perform authentication and authorization.

8. The system of claim 1, the policy component including at least one of a security parameter, at least one rule, at least one filter, a filter list, an authentication method, a tunnel parameter, and a connection type.

9. The system of claim 1, the policy component includes at least one user-defined rule for at least one of permitting and denying access to the industrial controller.

10. The system of claim 9, the user-defined rule includes at least one of time-based, location-based, user-based, and process-based rule.

11. The system of claim 10, further comprising logical rules established for at least one of a selected policy and combinations of policies, the logical rules include at least one of AND, OR, NOT, BOOLEAN, and mathematical combinations.

12. The system of claim 1, the at least one security component including a Virtual Private Network (VPN) component to facilitate communications within a private network.

13. The system of claim 1, the at least one security component including a virus detection component that includes at least one of a commercially available detection program and a custom-coded detection program.

14. The system of claim 1, the mappings further comprise at least one of security configurations relating to an area and security configurations relating to a device associated with the industrial controller.

15. The system of claim 1, further comprising at least one of, a security components store to store security components, and a security mappings store to relate the security layers to at least one of an area within the industrial controller and a module associated with the industrial controller.

16. The system of claim 1, the at least one security component includes a locking component to at least one of grant and prevent access to the industrial controller.

17. The system of claim 16, the locking component includes a subnet list describing network addresses of devices.

18. The system of claim 1, the operating system comprising at least one of Windows, Windows NT, Linux, .NET, OS-9, UNIX, Windows CE, CE.NET, VxWorks and VRTX.

19. The system of claim 1, the encryption component is employed to at least one of encapsulate and encrypt a control protocol.

20. The system of claim 19, the control protocol includes at least one of a EtherNet/IP, DeviceNet, ControlNet, OPC DX, OPC DA, Data Highway, and Data Highway+ protocol.

21. A method to facilitate secure data exchange in an industrial controller network, comprising:

mapping at least one security component, based at least on encryption technology, that relates respective areas and/or modules associated with an industrial controller to at least one security layer in the industrial controller, the mapping is associated with at least one policy and/or rule that define when the mapping is active;

associating a plurality of security layers to at least one security component per layer through 1 to M mappings, the plurality of security layers are associated with at least one of similar security components or dissimilar security components, M is an integer;

storing a mapping as a configuration to define communications access to the industrial controller, including potential areas within the industrial controller and/or associated modules that interact with the industrial controller; and communicating to the industrial controller in accordance with the stored mapping.

22. The method of claim 21, further comprising mapping a trust component, an encryption component and a policy component.

23. The method of claim 21, further comprising exchanging at least one of a certificate, a pre-shared key, and a ticket to facilitate a trust.

24. The method of claim 21, further comprising at least one of authenticating and authorizing an entity.

25. The method of claim 24, further comprising a negotiation to perform authentication and authorization.

26. The method of claim 21, further comprising defining rules that include at least one of time-based, location-based, user-based, process-based, and logical-based combination rules.

27. The method of claim 21, further comprising creating a private network across a public network to provide access to the industrial controller.

28. The method of claim 21, further comprising detecting viruses on the industrial controller.

29. The method of claim 21, further comprising segmenting at least one of an area and a device associated with the industrial controller in according to the mapping.

30. The method of claim 21, further comprising configuring a locking component to at least one of grant and prevent access to the industrial controller.

31. An industrial control system, comprising:

a plurality of remote devices communicating on a network;

an industrial controller that communicates with the remote devices;

a plurality of security layers stored in the industrial controller, the security layers associated with at least one security component further comprising at least one of a trust component to authenticate a trust relationship between a remote device and the industrial controller, an encryption component to provide data encryption, and a policy component to facilitate varying levels of data access to the industrial controller and including user interface editing parameters;

1 to M mappings that relate a plurality of security layers configured in the industrial controller to at least one security component per layer, the security layers are associated with at least one of similar security components and dissimilar security components, M being an integer;

a security layer store residing in the industrial controller to map security layers to security components;

an operating system to configure the security layers, the at least one security component stored in accordance with the operating system and an associated memory subsystem; and a processor to execute the operating system, the processor limits communications from the remote devices based in part on the configured security layers.

* * * * *